US012739478B2

(12) United States Patent
Park et al.

(10) Patent No.: US 12,739,478 B2
(45) Date of Patent: Sep. 15, 2026

(54) VIDEO DISPLAY DEVICE AND METHOD FOR OPERATING SAME

(71) Applicant: LG ELECTRONICS INC., Seoul (KR)

(72) Inventors: Sukwon Park, Seoul (KR); Minyoung Yang, Seoul (KR); Boram Park, Seoul (KR); Jisu Yu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/691,562

(22) PCT Filed: Sep. 14, 2021

(86) PCT No.: PCT/KR2021/012488

§ 371 (c)(1),
(2) Date: Mar. 13, 2024

(87) PCT Pub. No.: WO2023/042927

PCT Pub. Date: Mar. 23, 2023

(65) Prior Publication Data

US 2024/0406515 A1 Dec. 5, 2024

(51) Int. Cl.
*H04N 21/234* (2011.01)
*H04N 21/24* (2011.01)
(Continued)

(52) U.S. Cl.
CPC ....... *H04N 21/812* (2013.01); *H04N 21/4884* (2013.01)

(58) Field of Classification Search
None
See application file for complete search history.

(56) References Cited

U.S. PATENT DOCUMENTS 10,489,496 B1 * 11/2019 Sen .................... H04N 21/4122
2006/0149622 A1 7/2006 Baluja et al.
(Continued)

FOREIGN PATENT DOCUMENTS

CN 107682733 4/2020
JP 2013198110 9/2013
(Continued)

OTHER PUBLICATIONS

PCT International Application No. PCT/KR2021/012488, International Search Report dated Jun. 2, 2022, 5 pages.
(Continued)

*Primary Examiner* — Brian T Pendleton
*Assistant Examiner* — Jean D Saint Cyr
(74) *Attorney, Agent, or Firm* — LEE, HONG, DEGERMAN, KANG & WAIMEY

(57) ABSTRACT

The present invention relates to a video display device and a method for operating same. The video display device according to one embodiment of the present invention comprises: a display; a network interface unit that performs communication through a network; and a control unit, wherein the control unit may receive video data and subtitle data corresponding to predetermined content from a first server through the network interface unit, extract advertisement information from the subtitle data, acquire advertisement data corresponding to the advertisement information from a second server through the network interface unit, and output, though the display, a screen including at least one of an image frame corresponding to the video data, a subtitle object corresponding to the subtitle data, and an advertisement object corresponding to the advertisement data. Various other embodiments are possible.

10 Claims, 13 Drawing Sheets

(51) Int. Cl.

| | |
|---|---|
| ***H04N 21/262*** | (2011.01) |
| ***H04N 21/422*** | (2011.01) |
| ***H04N 21/431*** | (2011.01) |
| ***H04N 21/433*** | (2011.01) |
| ***H04N 21/44*** | (2011.01) |
| ***H04N 21/485*** | (2011.01) |
| ***H04N 21/488*** | (2011.01) |
| ***H04N 21/81*** | (2011.01) |

(56) References Cited

U.S. PATENT DOCUMENTS

2010/0299199 A1 11/2010 Kang
2012/0284742 A1 11/2012 Sharma et al.
2014/0098714 A1* 4/2014 Morsy ................ H04N 21/4126 370/260
2016/0088353 A1* 3/2016 Kim .................. H04N 21/4312 725/10
2016/0381433 A1 12/2016 Dhungana

FOREIGN PATENT DOCUMENTS

KR 100916717 9/2009
KR 1020120103531 9/2012
KR 1020150066915 6/2015

OTHER PUBLICATIONS

European Patent Office Application Serial No. 21957595.8, Search Report dated Jun. 5, 2025, 16 pages.
European Patent Office Application Serial No. 21957595.8, Office Action dated May 21, 2026, 9 pages.

* cited by examiner

```
00:02:30.000 --> 00:02:35.150        601
{
"NEWID+" :
[{  "text" : null,        602
                                              603
    "image" :
    [{
    "src" : "https://static.wixstatic.com/media/fbfe8c_57ff3d284cf64121b9c13dc78c007c45~mv2.png" ,
    "anchor_x' : "27.09%"
    "anchor_y' : "44.75%"
    }],
    effect" :
       [{"type" : "popup", 'style" : "fade_in" , "duration' : 2 },
       {'type" : "popout", 'style" : "slide_out", "duration" : 2        604
       }]
}]
}
```

FIG. 7B

```
00:01:00.000 --> 00:01:15.300  ~701
{
"NEWID+" :
[{ "text" : [{
  "src" : "#n.flying #ustour2019 #koop #fnc" ,
  "anchor_x" : "12.40%" ,
  "anchor_y" : "84.35%" ,
  "size" : "2.78%" ,
  "background_color" : "#7A43F0",
  "font_color" : "#FFFFFF"                       ~702
 },
 { "src" : "tiny.co/nflying-livetour" ,
  "anchor_x" : "12.40%" ,
  "anchor_y" : "75.37%" ,
  "font" : "miso" ,
  "size" : "2.78%"
  "background_color" : "#232323",
  "font_color" : "#FFFFFF"
 }] ,                                                                    703
  "image" :
  [{"src" : https://static.wixstatic.com/media/fbfe8c_070187ba95a14029b7bf2ebca8d93ef1~mv2.png" ,
  "anchor_x" : "2.29%" ,
  "anchor_y" : "84.35%" ,
  }] ,
  "effect" :
  [{"type" : "popup", "style" : "fade_in" , "duration" : 2 },    ~704
  {"type" : "popout", "style" : "slide_out", "duration" : 2 }],
}]
}
```

VIDEO DISPLAY DEVICE AND METHOD FOR OPERATING SAME

CROSS-REFERENCE TO RELATED APPLICATION(S)

This application is the National Stage filing under 35 U.S.C. 371 of International Application No. PCT/KR2021/012488, filed on Sep. 14, 2021, the contents of which are all incorporated by reference herein in its entirety.

TECHNICAL FIELD

The present disclosure relates to an image display device and a method of operating the same.

BACKGROUND ART

An image display device is a device that has the function of displaying image that a user can watch, and a user can watch broadcasts through an image display device. For example, an image display device may include Television (TV), monitor, projector, etc equipped with a liquid crystal display (LCD) using liquid crystal or an OLED display using organic light emitting diode (OLED).

Recently, digital TV services using wired or wireless network have become popular, and digital TV services provide a variety of services that cannot be provided by existing analog broadcasting services. Here, digital TV services may include not only digital terrestrial broadcasting, but also VOD services provided through digital cable broadcasting, digital satellite broadcasting, Internet Protocol Television (IPTV) service, terrestrial and satellite DMB services, and communication network.

In addition, recently, various Over The Top (OTT) service providers are providing image content through networks like existing broadcasting providers, and the number of users watching image content using OTT services is also increasing. As the number of providers providing image content increases, even when a user watches the same image content, advertisements displayed to a user along with the image content may vary depending on a provider.

Conventionally, a business operator providing image content performs image processing so that an object corresponding to an advertisement is added to an existing image frame of the image content, and then provides the image-processed image frame to a user. However, when a business operator performs image processing for an advertisement like the conventional method, there is a problem in that the burden on a business operator increases as image processing is required for each image frame. In addition, when adding the same advertisement to multiple contents, there is an inconvenience in that the business operator must perform image processing for each of the multiple contents. In addition, whenever the advertisement provided with the image content is changed, there is a problem in that the business operator must re-perform image processing for the advertisement.

DISCLOSURE

Technical Problem

The present disclosure has been made in view of the above problems.

And provides an image display device that can provide advertisements along with image content to a user by using subtitle data corresponding to the image content, and a method of operating the same.

The present disclosure further provides an image display device that can induce interaction between a user who watches advertisements and an advertiser who expects effects from advertisements, and a method of operating the same.

The present disclosure further provides an image display device that can provide advertisements corresponding to user's object of interest by using keywords included in subtitle, and a method of operating the same.

Technical Solution

In an aspect, there is provided an image display device, including: a display; a network interface unit configured to perform communication through a network; and a controller, wherein the controller receives image data and subtitle data corresponding to certain content from a first server, through the network interface unit, extracts advertisement information from the subtitle data, obtains advertisement data corresponding to the advertisement information from a second server through the network interface unit, and outputs a screen including at least one of an image frame corresponding to the image data, a subtitle object corresponding to the subtitle data, and an advertisement object corresponding to the advertisement data, through the display.

In another aspect, there is provided a method of operating an image display device, the method including: receiving image data and subtitle data corresponding to certain content from a first server; extracting advertisement information from the subtitle data; obtaining advertisement data corresponding to the advertisement information from a second server; and outputting a screen including at least one of an image frame corresponding to the image data, a subtitle object corresponding to the subtitle data, and an advertisement object corresponding to the advertisement data.

Advantageous Effects

The effects of the image display device and the method of operating the same according to the present disclosure will be described as follows.

According to at least one embodiment of the present disclosure, advertisements along with image content can be conveniently provided to a user, by using advertisement information included in subtitle data corresponding to image content.

In addition, according to at least one embodiment of the present disclosure, it is possible to access the advertiser's server according to a user input, thereby inducing interaction between a user who watches the advertisement according to the user input and the advertiser who expects an effect through the advertisement.

In addition, according to at least one embodiment of the present disclosure, an advertisement corresponding to user's object of interest can be provided by using keywords included in a subtitle.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR INVENTION

Figure 1:
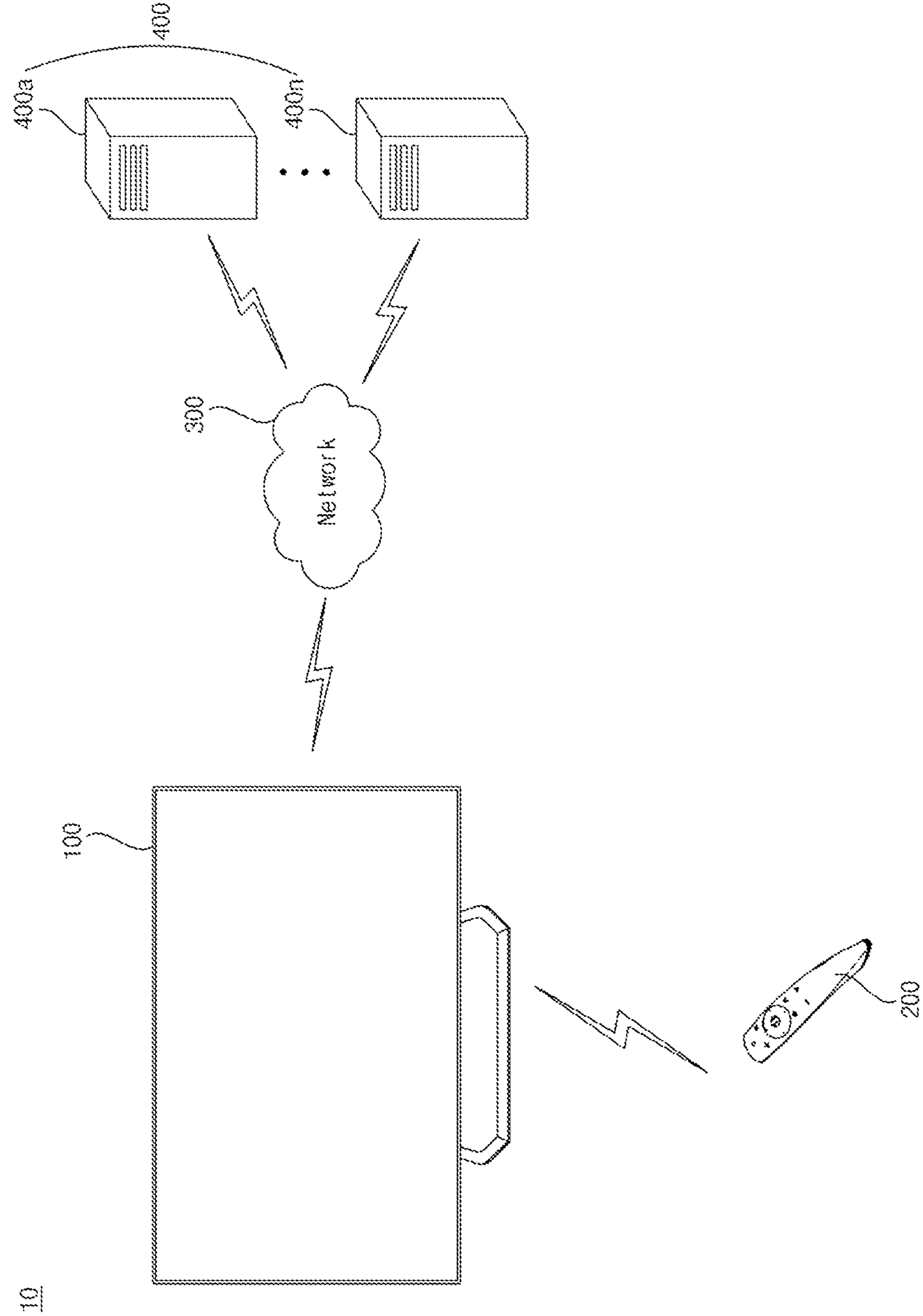
FIG. 1 is a diagram illustrating a system according to an embodiment of the present disclosure.

Hereinafter, the present disclosure will be described in detail with reference to the drawings. In the drawings, parts not related to the description are omitted in order to clearly and briefly explain the present disclosure, and identical or extremely similar parts are denoted by the same drawing reference numerals throughout the specification.

In general, suffixes such as “module” and “unit” may be used to refer to elements or components. Use of such suffixes herein is merely intended to facilitate description of the specification, and the suffixes do not have any special meaning or function. Accordingly, the terms “module” and “unit” may be used interchangeably.

In the present application, it should be understood that the terms “comprises, includes,” “has,” etc. specify the presence of features, numbers, steps, operations, elements, components, or combinations thereof described in the specification, but do not preclude the presence or addition of one or more other features, numbers, steps, operations, elements, components, or combinations thereof.

In addition, it will be understood that although the terms first, second, etc. may be used herein to describe various elements, these elements should not be limited by these terms. These terms are only used to distinguish one element from another.

FIG. 1 is a diagram illustrating a system according to various embodiments of the present disclosure.

Referring to FIG. 1, a system 10 may include an image display device 100, a remote control device 200, a server 400, and/or at least one external server 500, 600.

The image display device 100 may be a device that processes and outputs images. The image display device 100 is not particularly limited as long as it can output a screen corresponding to image signal, such as a TV, laptop computer, and monitor.

The image display device 100 may receive and process a broadcast signal, and output a signal-processed broadcast image. When the image display device 100 receives a broadcast signal, the image display device 100 may correspond to a broadcast reception device.

The image display device 100 may receive broadcast signals wirelessly through an antenna, or may receive broadcast signals in a wired manner through a cable. For example, the image display device 100 may receive terrestrial broadcasting signal, satellite broadcasting signal, cable broadcasting signal, and Internet Protocol Television (IPTV) broadcasting signal.

The remote control device 200 may be connected to the image display device 100 by wire and/or wirelessly, and provide various control signals to the image display device 100. At this time, the remote control device 200 may include a device that establish a wired or wireless network with the image display device 100, and through the established network, transmit various control signals to the image display device 100, or receive a signal related to various operations processed in the image display device 100 from the image display device 100.

For example, various input devices such as a mouse, keyboard, spatial remote control, trackball, and joystick may be used as the remote control device 200.

The image display device 100 may be connected to only a single remote control device 200 or simultaneously connected to two or more remote control devices 200, and based on a control signal provided from each remote control device 200, may change an object displayed on a screen or may adjust a screen state.

The image display device 100 may transmit and receive data to and from at least one server 400, via a network 300 such as the Internet.

The server 400 may process data received from the image display device 100.

The server 400 may be located in the same or similar area, or may be located in separate areas. For example, the server 400, 500 may be implemented in a single server, or may be implemented in a first server 400*a* and a second server 400*b* that are separated from each other.

The server 400 may transmit and receive data to and from each other via the network 300.

Figure 2:
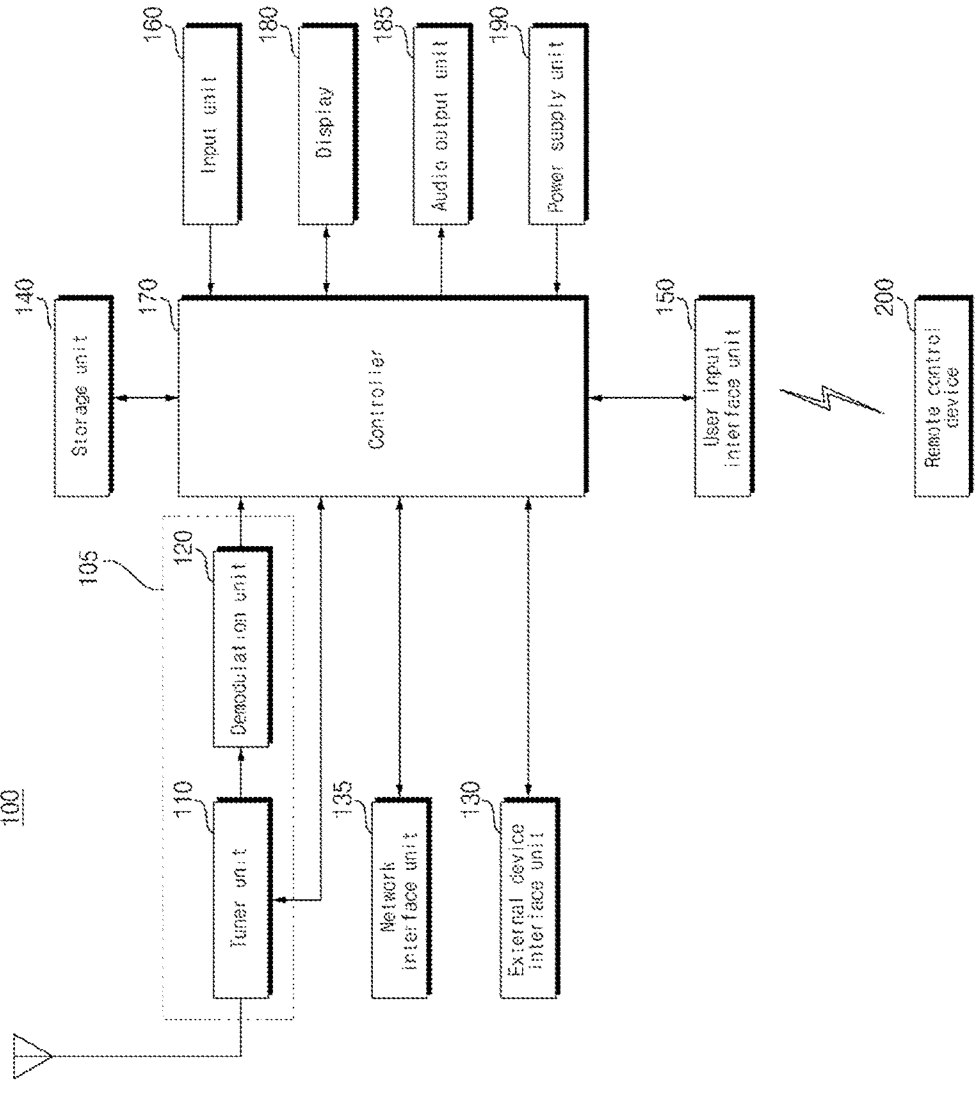
FIG. 2 is an example of an internal block diagram of an image display device of FIG. 1.

FIG. 2 is an internal block diagram of the image display device of FIG. 1.

Referring to FIG. 2, the image display device 100 may include a broadcast reception unit 105, an external device interface unit 130, a network interface unit 135, a storage unit 140, a user input interface unit 150, and an input unit 160, a controller 170, a display 180, an audio output unit 185, and/or a power supply unit 190.

The broadcast reception unit 105 may include a tuner unit 110 and a demodulation unit 120.

The tuner unit 110 may select a broadcast signal corresponding to a channel selected by a user or all pre-stored channels among broadcast signals received through an antenna (not shown) or a cable (not shown). The tuner unit 110 may convert the selected broadcast signal into an intermediate frequency signal or a baseband image or an voice signal.

For example, when the selected broadcast signal is a digital broadcast signal, the tuner unit 110 may convert the signal into a digital IF signal (DIF), and when the selected broadcast signal is an analog broadcast signal, may convert the signal into an analog baseband image or an voice signal (CVBS/SIF). That is, the tuner unit 110 may process digital broadcasting signal or analog broadcasting signal. The analog base band image or voice signal (CVBS/SIF) output from the tuner unit 110 may be directly input to the controller 170.

Meanwhile, the tuner unit 110 may sequentially select broadcast signals of all broadcast channels stored through a channel memory function among received broadcast signals, and convert them into intermediate frequency signals or base band image or voice signals.

Meanwhile, the tuner unit 110 may be equipped with a plurality of tuners in order to receive broadcast signals of multiple channels. Alternatively, a single tuner that simultaneously receives broadcast signals from multiple channels is also possible.

The demodulation unit 120 may receive the digital IF signal (DIF) converted by the tuner unit 110 and perform a demodulation operation.

The demodulation unit 120 may output a stream signal (TS) after performing demodulation and channel decoding. At this time, the stream signal may be a multiplexed image signal, voice signal, or data signal.

The stream signal output from the demodulation unit 120 may be input to the controller 170. After performing demultiplexing, image/voice signal processing, etc, the controller 170 may output image through the display 180, and output voice through the audio output unit 185.

The external device interface unit 130 may transmit or receive data with a connected external device. To this end, the external device interface unit 130 may include an A/V input/output unit (not shown).

The external device interface unit 130 may be connected in a wired/wireless manner to external devices such as Digital Versatile Disk (DVD), Blu ray, game device, camera, camcorder, computer (laptop), and set-top box, and may perform input/output operation with external devices.

The A/V input/output unit may receive image and voice signals from an external device. For example, the A/V input/output unit may include Ethernet terminal, USB terminal, Composite Video Banking Sync (CVBS) terminal, component terminal, S-video terminal (analog), Digital Visual Interface (DVI) terminal, High Definition Multimedia Interface (HDMI) terminal, Mobile High-definition Link (MHL) terminal, RGB terminal, D-SUB terminal, IEEE 1394 terminal, SPDIF terminal, Liquid HD terminal, etc. Digital signals input through such terminals may be transmitted to the controller 170. At this time, the analog signal input through the CVBS terminal and the S-video terminal may be converted into a digital signal through an analog-to-digital converter (not shown), and transmitted to the controller 170.

The external device interface unit 130 may include a wireless communication unit (not shown) for short-range wireless communication with other electronic devices. Through such a wireless communication unit, the external device interface unit 130 may exchange data with an adjacent mobile terminal. For example, the external device interface unit 130 may receive device information, executing application information, application images, etc. from the mobile terminal in a mirroring mode.

The external device interface unit 130 may perform short-range wireless communication by using Bluetooth, Radio Frequency Identification (RFID), Infrared Data Association (IrDA), Ultra-Wideband (UWB), ZigBee, etc.

The network interface unit 135 may provide an interface for connecting the image display device 100 to a wired/wireless network including an Internet network.

The network interface unit 135 may include a communication module (not shown) for connection to the wired/wireless network 400. For example, the network interface unit 135 may include a communication module for wireless LAN (WLAN) (Wi-Fi), wireless broadband (Wibro), World Interoperability for Microwave Access (Wimax), High Speed Downlink Packet Access (HSDPA), etc.

The network interface unit 135 may transmit or receive data with other users or other electronic devices through a connected network or other network linked to the connected network.

The network interface unit 135 may receive web content or data provided by a content provider or network operator. That is, the network interface unit 135 may receive web content such as movie, advertisement, game, VOD, and broadcast signal provided from a content provider or network provider through a network and information related thereto.

The storage unit 140 may store programs for processing and controlling each signal in the controller 170, or may store processed image, voice, or data signal. For example, the storage unit 140 may store application programs designed for the purpose of performing various tasks that can be processed by the controller 170, and may selectively provide some of the stored application programs, upon request from the controller 170.

Programs, and the like stored in the storage unit 140 are not particularly limited as long as they can be executed by the controller 170.

The storage unit 140 may perform a function for temporarily storing image, voice, or data signal received from an external device through the external device interface unit 130.

The storage unit 140 may store information related to a certain broadcast channel through a channel memory function such as a channel map.

Although FIG. 2 shows an embodiment in which the storage unit 140 is provided separately from the controller 170, the scope of the present disclosure is not limited thereto, and the storage unit 140 may be included in the controller 170.

The storage unit 140 may include at least one of volatile memory (e.g., DRAM, SRAM, SDRAM, etc.), and non-volatile memory (e.g., flash memory, hard disk drive (HDD), solid-state drive (SSD), etc.). In various embodiments of the present disclosure, the storage unit 140 and the memory may be used interchangeably.

The user input interface unit 150 may transmit a signal input by a user to the controller 170, or transmit a signal from the controller 170 to a user. For example, it may transmit/receive a user input signal such as power on/off, channel selection, and screen settings from the remote control device 250, may transmit a user input signal input from a local key (not shown) such as power key, channel key, volume key, and setting key to the controller 170, may transmit a user input signal input from a sensor unit (not shown) that senses user's gesture to controller 170, or may transmit a signal from the controller 170 to the sensor unit.

The input unit 160 may be provided in one side of the main body of the image display device 100. For example, the input unit 160 may include a touch pad, a physical button, etc.

The input unit 160 may receive various user commands related to the operation of the image display device 100, and transmit control signals corresponding to the input commands to the controller 170. The input unit 160 may transmit a control signal corresponding to the input command to the controller 170 through the user input interface unit 150.

The input unit 160 may include at least one microphone (not shown). The microphone may receive sound and transmit a signal corresponding to the received sound to the controller 170. For example, the input unit 160 may receive the user's voice through the microphone.

The controller 170 may include at least one processor, and, by using a processor included therein, may control the overall operation of the image display device 100. Here, the processor may be a general processor such as a central processing unit (CPU). Obviously, the processor may be a dedicated device such as an ASIC or another hardware-based processor.

The controller 170 may demultiplex a stream input through the tuner unit 110, the demodulation unit 120, the external device interface unit 130, or the network interface unit 135, or may generated and output a signal for image or voice output by processing the demultiplexed signals.

The display 180 may generate a driving signal by converting the image signal, data signal, OSD signal, and control signal processed by the controller 170, or the image signal, data signal, control signal, etc received from the external device interface unit 130.

The display 180 may include a display panel (not shown) having a plurality of pixels. A plurality of pixels provided in the display panel may include a RGB subpixel. Alternatively, a plurality of pixels provided in the display panel may include a RGBW subpixel. The display 180 may convert the image signal, data signal, OSD signal, control signal, etc. processed by the controller 170 to generate a driving signal for a plurality of pixels.

The display 180 may be a plasma display panel (PDP), liquid crystal display (LCD), organic light emitting diode (OLED), flexible display, etc., and may also be a 3D display. The 3D display 180 may be divided into a glasses-free type and a glasses type.

Meanwhile, the display 180 may be configured as a touch screen and used as an input device in addition to an output device.

The audio output unit 185 receives the voice-processed signal from the controller 170 and outputs it as voice.

The image signal processed by the controller 170 may be input to the display 180, and displayed as an image corresponding to a relevant image signal. In addition, the image signal processed by the controller 170 may be input to an external output device through the external device interface unit 130.

The voice signal processed by the controller 170 may be output as sound to the audio output unit 185. In addition, the voice signal processed by the controller 170 may be input to an external output device through the external device interface unit 130.

Although not shown in FIG. 2, the controller 170 may include a demultiplexer, an image processor, a mixer, a frame rate converter, a formatter, an audio processor, a data processor, etc.

In addition, the controller 170 may control overall operation inside the image display device 100. For example, the controller 170 may control the tuner unit 110 to select (tuning) a broadcast corresponding to a channel selected by a user or a pre-stored channel.

In addition, the controller 170 may control the image display device 100 by a user command input through the user input interface unit 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may allow a certain 2D object to be displayed in the image displayed on the display 180. For example, the object may be at least one of a connected web screen (newspaper, magazine, etc.), Electronic Program Guide (EPG), various menus, widget, icon, still image, moving image, and text.

Meanwhile, the image display device 100 may further include a photographing unit (not shown). The photographing unit may photograph a user. The photographing unit may be implemented with a single camera, but is not limited thereto, and may also be implemented with a plurality of cameras. Meanwhile, the photographing unit may be embedded in the image display device 100 in the upper portion of the display 180 or may be disposed separately. Image information photographed by the photographing unit may be input to the controller 170.

The controller 170 may recognize a user's location based on the image photographed by the photographing unit. For example, the controller 170 may determine the distance (z-axis coordinate) between a user and the image display device 100. In addition, the controller 170 may determine the x-axis coordinate and y-axis coordinate in the display 180 corresponding to a user's location.

The controller 170 may detect a user's gesture based on each of an image photographed by the photographing unit or a signal sensed from the sensor unit, or a combination thereof.

The power supply unit 190 may supply a corresponding power throughout the image display device 100. In particular, power may be supplied to the controller 170, which can be implemented in the form of a system on chip (SOC), the display 180 for displaying images, and the audio output unit 185 for audio output.

Specifically, the power supply unit 190 may include a converter (not shown) that converts AC power to DC power and a DC/DC converter (not shown) that converts the level of DC power.

The remote control device 200 may transmit user input to the user input interface unit 150. To this end, the remote control device 200 may use Bluetooth, Radio Frequency (RF) communication, Infrared Radiation communication, Ultra-wideband (UWB), ZigBee, etc. In addition, the remote control device 200 may receive image, voice, or data signal output from the user input interface unit 150, and display it or output as voice by the remote control device 200.

Meanwhile, the above-described image display device 100 may be a digital broadcasting receiver capable of receiving a fixed or mobile digital broadcasting.

Meanwhile, the block diagram of the image display device 100 shown in FIG. 2 is only a block diagram for an embodiment of the present disclosure, and each component of the block diagram may be combined, added, or omitted according to the specifications of the image display device 100 that is actually implemented.

That is, if necessary, two or more components may be combined into one component, or one component may be subdivided into two or more components. In addition, the function performed by each block is just for explaining embodiments of the present disclosure, and a specific operation or device does not limit the scope of the present disclosure.

Figure 3A:
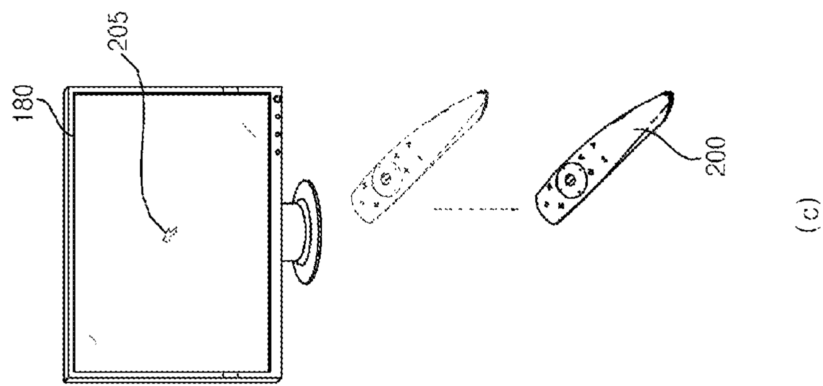
FIG. 3A is a diagram showing a control method of a remote control device of FIG. 2.
Figure 3A:
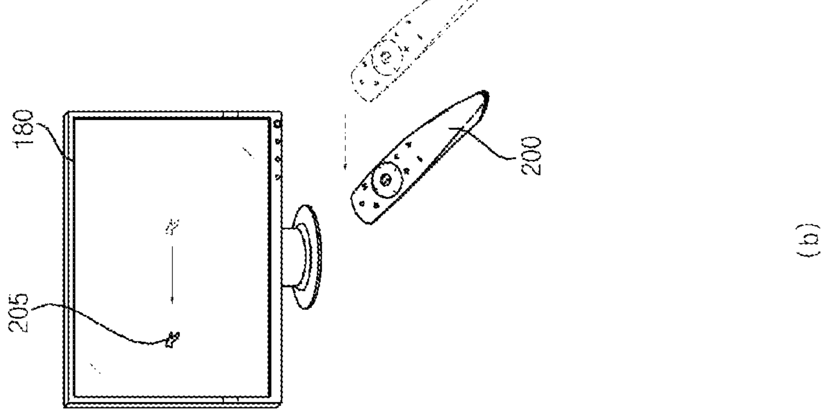
Figure 3A:
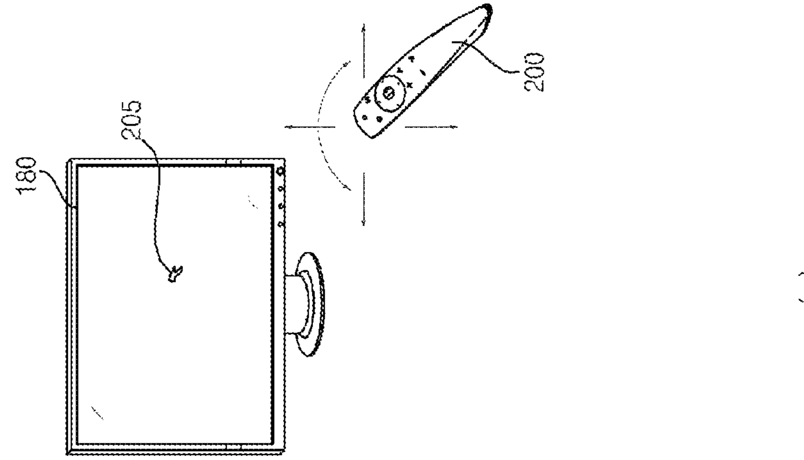
Figure 3B:
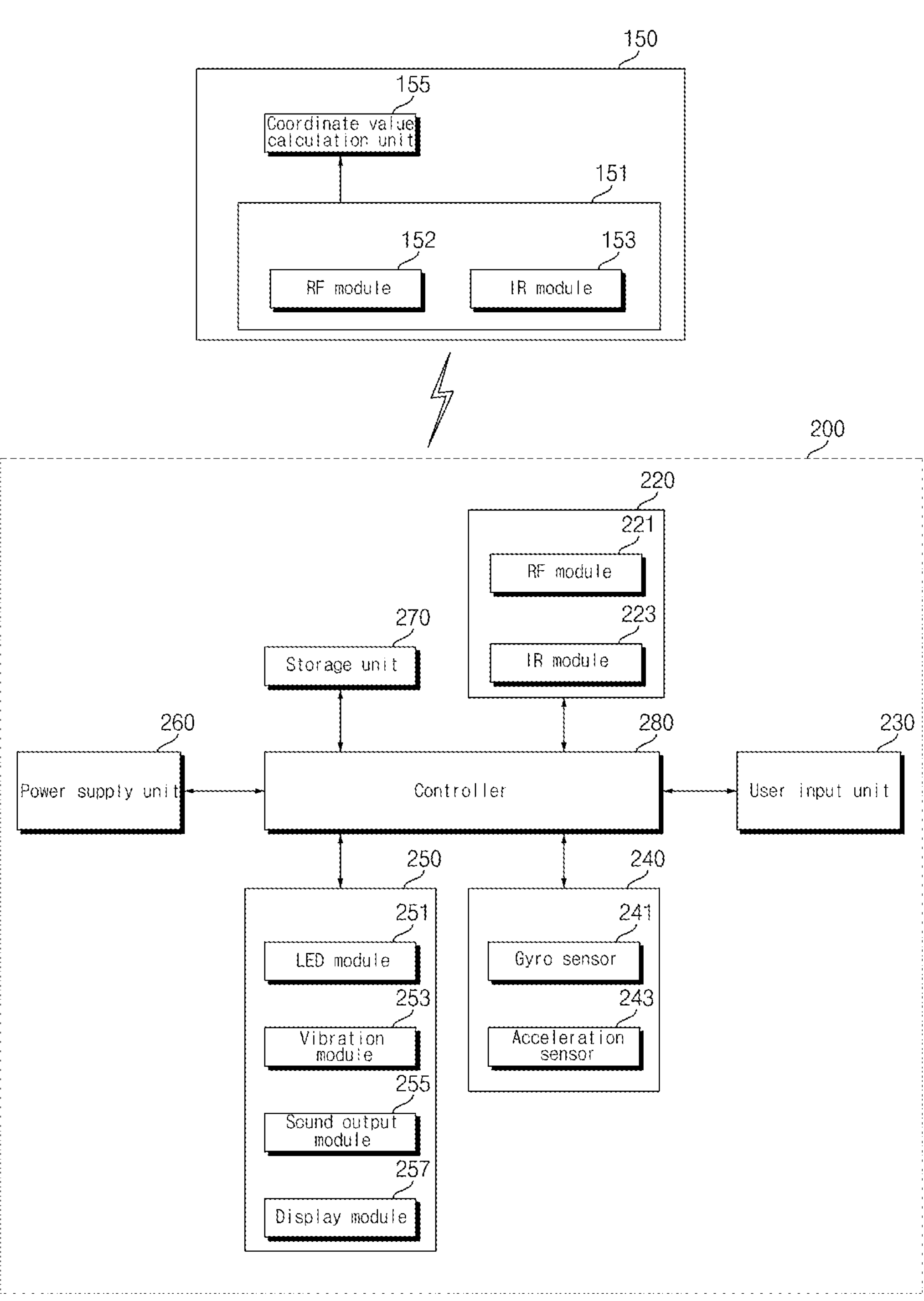
FIG. 3B is an example of an internal block diagram of the remote control device of FIG. 2.

FIG. 3A is a diagram showing a control method of the remote control device of FIG. 2, and FIG. 3B is an example of an internal block diagram of the remote control device of FIG. 2.

Referring to FIG. 3A, it can be seen that a pointer 205 corresponding to the remote control device 200 is displayed on the display 180 of the image display device 100.

Referring to FIG. 3A (a), a user may move or rotate the remote control device 200 up and down, left and right, back and forth. At this time, the pointer 205 displayed on the display 180 of the image display device 100 may be displayed in response to the movement of the remote control device 200. As shown in the drawing, such a remote control device 200 may be named a spatial remote control or a 3D pointing device, because the corresponding pointer 205 is moved and displayed according to movement in 3D space.

Referring to FIG. 3A (b), when a user moves the remote control device 200 to the left, it can be seen that the pointer 205 displayed on the display 180 of the image display device 100 also moves to the left in response to the movement of the remote control device 200.

Information related to the movement of the remote control device 200 detected through the sensor of the remote control device 200 may be transmitted to the image display device 100. The image display device 100 may calculate the coordinate of the pointer 205 from the information related to the movement of the remote control device 200. The image display device 100 may display the pointer 205 to correspond to the calculated coordinate.

Referring to FIG. 3A (c), while pressing a specific button provided in the remote control device 200, a user may move the remote control device 200 away from the display 180. Thus, the selected area in the display 180 corresponding to the pointer 205 may be zoomed-in and displayed enlarged. On the contrary, when a user moves the remote control device 200 to approach the display 180 while pressing a specific button provided in the remote control device 200, the selected area in the display 180 corresponding to the pointer 205 may be zoomed-out and displayed in a reduced size.

Meanwhile, when the remote control device 200 moves away from the display 180, the selected area may be zoomed out, and when the remote control device 200 approaches the display 180, the selected area may be zoomed in.

Meanwhile, when a user presses a specific button in the remote control device 200, recognition of up-down and left-right movements may be excluded. That is, when the remote control device 200 moves away from or approaches the display 180, up, down, left, and right movements are not recognized, and only forward and backward movements may be recognized. When a user does not press a specific button in the remote control device 200, only up, down, left, and right movements of the remote control device 200 may be recognized, and only the pointer 205 may be moved accordingly.

Meanwhile, the moving speed or moving direction of the pointer 205 may correspond to the moving speed or moving direction of the remote control device 200.

Referring to FIG. 3*b*, the remote control device 200 may include a wireless communication unit 220, a user input unit 230, a sensor unit 240, an output unit 250, a power supply unit 260, a storage unit 270, and/or a controller 280.

The wireless communication unit 220 may transmit and receive signals to and from the image display device 100.

In this embodiment, the remote control device 200 may be equipped with an RF module 221 that can transmit and receive signals with the image display device 100 according to a Radio Frequency (RF) communication standard. In addition, the remote control device 200 may be equipped with an IR module 223 that can transmit and receive signals with the image display device 100 according to an Infrared radiation (IR) communication standard.

The remote control device 200 may transmit a signal including information related to the movement of the remote control device 200 to the image display device 100 through the RF module 221. The remote control device 200 may receive a signal transmitted by the image display device 100 through the RF module 221.

The remote control device 200 may transmit commands for power on/off, channel change, volume change, etc. to the image display device 100 through the IR module 223.

The user input unit 230 may be composed of a keypad, button, touch pad, touch screen, etc. A user may input commands related to the image display device 100 to the remote control device 200 by operating the user input unit 230.

When the user input unit 230 is equipped with a hard key button, a user may input a command related to the image display device 100 to the remote control device 200 through a push operation of the hard key button.

When the user input unit 230 is equipped with a touch screen, a user may input a command related to the image display device 100 to the remote control device 200 by touching a soft key on the touch screen.

Meanwhile, the user input unit 230 may be equipped with various types of input means that a user can operate, such as scroll keys and jog key, and this embodiment does not limit the scope of the present disclosure.

The user input unit 230 may be equipped with a microphone. A user may utter a voice to the microphone provided in the user input unit 230. At this time, the microphone provided in the user input unit 230 may receive the voice uttered by the user.

The sensor unit 240 may include a gyro sensor 241 or an acceleration sensor 243. The gyro sensor 241 may sense the movement of the remote control device 200.

The gyro sensor 241 may sense information related to the operation of the remote control device 200 based on the x, y, and z axes. The acceleration sensor 243 may sense information related to the moving speed of the remote control device 200, etc. Meanwhile, the sensor unit 240 may further include a distance measurement sensor capable of sensing the distance to the display 180.

The output unit 250 may output an image or sound corresponding to an operation of the user input unit 230 or a signal transmitted from the image display device 100. Through the output unit 250, a user may recognize whether the user input unit 230 is operated or whether the image display device 100 is controlled.

The output unit 250 may include a LED module 251 including at least one light emitting element (e.g., Light Emitting Diode (LED)), a vibration module 253 that generates vibration, a sound output module 255 that outputs sound, and/or a display module 257 that outputs an image.

The power supply unit 260 may supply power to each component provided in the remote control device 200. The power supply unit 260 may include at least one battery (not shown).

When the movement of the remote control device 200 is not detected for a certain period of time through the sensor unit 240, the power supply unit 260 may stop supplying power to each component provided in the remote control device 200, thereby preventing unnecessary power consumption.

The power supply unit 260 may resume supplying power to each component provided in the remote control device 200 when a certain event occurs.

For example, the power supply unit 260 may resume supplying power to each component, when a certain key provided in the remote control device 200 is operated.

For example, when movement of the remote control device 200 is detected through the sensor unit 240, the power supply unit 260 may resume supplying power to each component provided in the remote control device 200.

The storage unit 270 may store various types of programs, application data, etc. necessary for controlling or operating the remote control device 200.

When the remote control device 200 transmits and receives signals wirelessly through the image display device 100 and the RF module 221, the remote control device 200 and the image display device 100 may transmit and receive signals through a certain frequency band. The controller 280 of the remote control device 200 may store information related to a frequency band, etc capable of wirelessly transmitting and receiving signals with the image display device 100 paired with the remote control device 200 in the storage unit 270, and may refer to it.

The controller 280 may include at least one processor, and, by using the processor included therein, may control the overall operation of the remote control device 200.

The controller 280 may transmit a control signal corresponding to a certain key operation of the user input unit 230 or a control signal corresponding to the movement of the remote control device 200 sensed by the sensor unit 240, to the image display device 100 through the wireless communication unit 220.

The user input interface unit 150 of the image display device 100 may include a wireless communication unit 151 capable of transmitting and receiving signals wirelessly with the remote control device 200, and a coordinate value calculation unit 155 capable of calculating the coordinate value of a pointer corresponding to the operation of the remote control device 200.

The user input interface unit 150 may transmit and receive signals wirelessly with the remote control device 200 through the RF module 152. In addition, the user input interface unit 150 may receive signals that the remote control device 200 transmits according to IR communication standards through the IR module 153.

The coordinate value calculation unit 155 may correct hand tremors or errors from signals corresponding to the operation of the remote control device 200 received through the wireless communication unit 151, and may calculate the coordinate value (x, y) of the pointer 205 to be displayed on the display 170.

The transmission signal of remote control device 200 inputted to the image display device 100 through the user input interface unit 150 may be transmitted to the controller 170 of the image display device 100. The controller 170 of the image display device 100 may check information related to the operation and key operation of the remote control device 200 from a signal transmitted from the remote control device 200 and, in response, may control the image display device 100.

As another example, the remote control device 200 may calculate a pointer coordinate value corresponding to the operation and output it to the user input interface unit 150 of the image display device 100. In this case, the user input interface unit 150 of the image display device 100 may transmit information related to the received pointer coordinate value to the controller 170 without a separate hand tremors or error correction process.

In addition, as another example, unlike the drawing, the coordinate value calculation unit 155 may be provided inside the controller 170 rather than in the user input interface unit 150.

Figure 4:
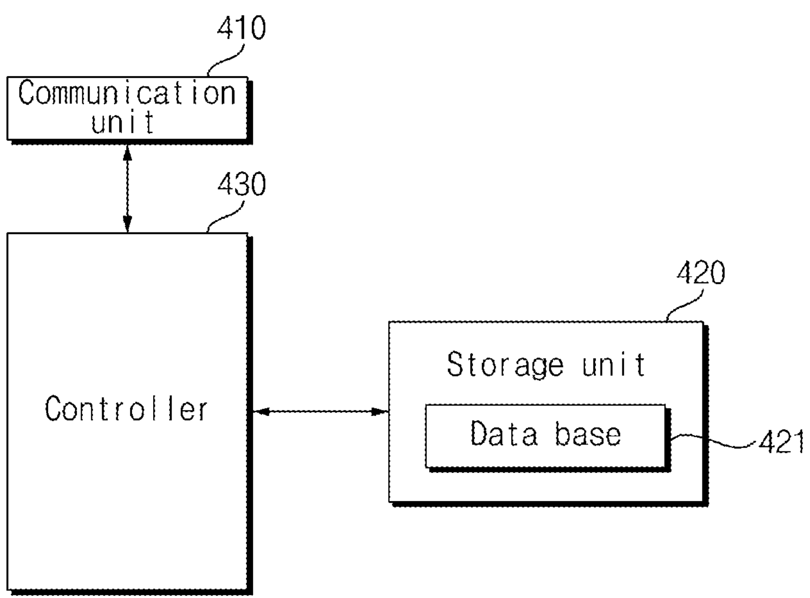
FIG. 4 is an internal block diagram of a server of FIG. 1.

FIG. 4 is an internal block diagram of the server of FIG. 1. Detailed description of content that is the same as/similar to that described in FIG. 2 will be omitted.

Referring to FIG. 4, the server 400 may include a communication unit 410, a storage unit 420, and/or a controller 430.

The communication unit 410 may include at least one communication module for connection to the wired/wireless network 300, and may communicate with the image display device 100 by connecting to the network 300.

The storage unit 420 may store programs for processing and controlling each signal in the controller 430, and may store processed data signals. For example, the storage unit 420 may store application programs designed for the purpose of performing various tasks that can be processed by the controller 430, and upon request from the controller 430, may selectively provide some of the stored application programs. The programs, etc stored in the storage unit 420 are not particularly limited as long as they can be executed by the controller 430.

The storage unit 420 may store data, model, algorithm, etc. previously learned through machine learning such as deep learning.

Although FIG. 4 shows an embodiment in which the storage unit 420 is provided separately from the controller 430, the scope of the present disclosure is not limited thereto, and the storage unit 420 may be included in the controller 430.

The storage unit 420 may include at least one of volatile memory (e.g., DRAM, SRAM, SDRAM, etc.), and non-volatile memory (e.g., flash memory, hard disk drive (HDD), solid state drive (SSD), etc.).

The storage unit 420 may store a database composed of data.

The controller 430 may be connected to each component provided in the server 400, and may control the overall operation of each component. The controller 430 may transmit and receive data to and from each component provided in the server 400.

The controller 430 may include at least one processor. Here, the processor may be a general processor such as a CPU. Obviously, the processor may be a dedicated device such as an ASIC or another hardware-based processor.

The controller 430 may transmit and receive data to and from the image display device 100 through the communication unit 410.

Figure 5A:
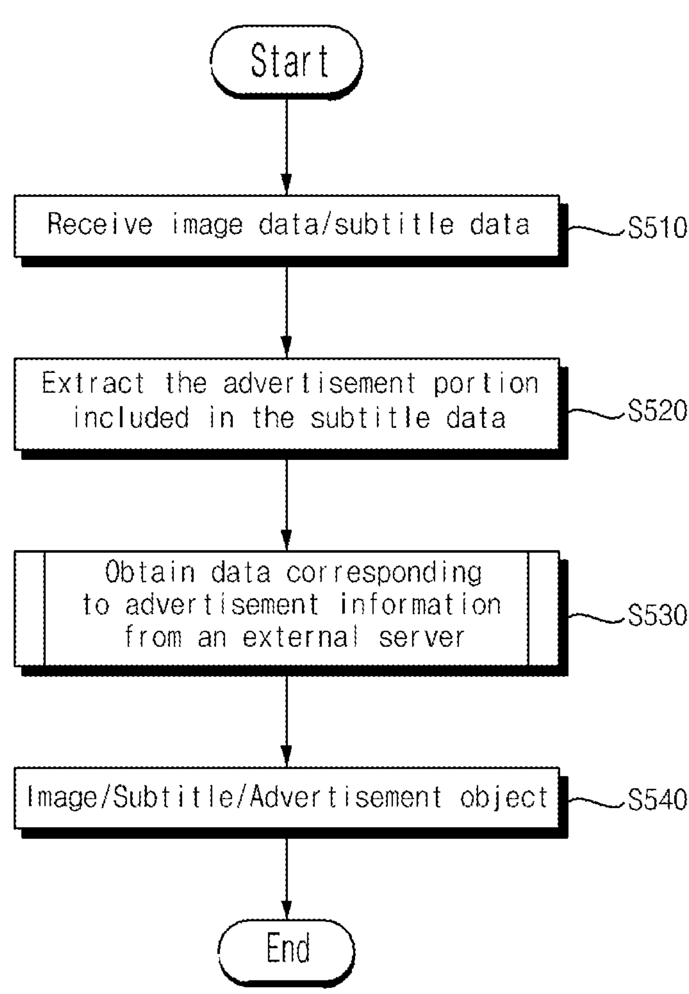
FIGS. 5A and 5B are flowcharts of a method of operating an image display device according to an embodiment of the present disclosure.
Figure 5B:
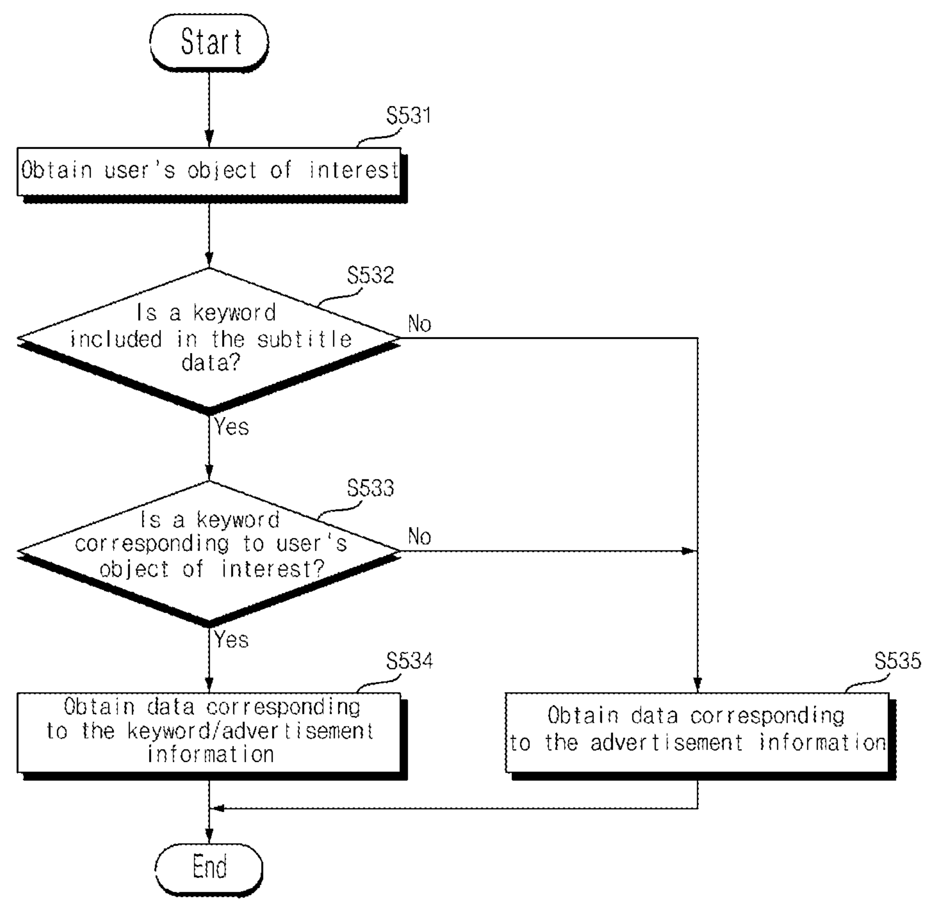

FIGS. 5A and 5B are flowcharts of a method of operating an image display device according to an embodiment of the present disclosure.

Referring to FIG. 5A, the image display device 100 may receive image data and subtitle data corresponding to certain content through the network interface unit 135, at operation S510. For example, the image display device 100 may connect to a server (hereinafter, referred to as content server) that provides content through the network 300, and receive image data and subtitle data corresponding to certain content from the content server.

Image data may include at least a portion of a plurality of image frames constituting certain content. Image data may include an index related to the order and/or playback time point of a plurality of image frames.

Subtitle data may include a playback time point at which a subtitle is output, text corresponding to the subtitle, and advertisement information corresponding to the advertisement provided to a user. Here, the advertisement information may include access information indicating a server (hereinafter referred to as an advertisement agency server) that provides data related to an advertisement, information indicating a target of advertisement, etc. For example, the advertisement information may include a Uniform Resource Locator (URL). Meanwhile, the subtitle data may further include information related to the location and size of the subtitle and/or advertisement displayed on the screen.

The image display device 100 may receive image data corresponding to certain content according to a streaming method. Here, the streaming method may refer to a method of first receiving some data corresponding to a first section among all data corresponding to certain content, and receiving some data corresponding to a second section following the first section while the image of the first section is output. Alternatively, the image display device 100 may receive image data corresponding to certain content according to a download method. Here, the download method may refer to a method of receiving all data corresponding to certain content.

The image display device 100 may receive subtitle data corresponding to certain content according to any one of a streaming method and a download method.

The image display device 100 may extract the advertisement portion included in the subtitle data, at operation S520. For example, the image display device 100 may parse subtitle data and divide it into a portion corresponding to a playback time point, a portion corresponding to text, and a portion corresponding to advertisement information.

The image display device 100 may obtain data corresponding to advertisement information of subtitle data from an external server, at operation S530. In this regard, this will be explained reference to FIG. 5B.

Referring to FIG. 5B, the image display device 100 may obtain a list (hereinafter referred to as interest list) of user's object of interest, at operation S531. For example, the image display device 100 may access a server (hereinafter referred to as user management server) that manages data of users through the network interface unit 135, and receive a list of interest from the user management server.

Here, the user management server may manage data on the functions and operations performed in the device from at least one device registered for a user, such as a smartphone, tablet computer, laptop computer, etc. For example, the user management server may receive data on the title and genre of the image content watched by a user through the image display device 100, and add it to the database. For example, the user management server may receive data on the title, genre, artist, etc. of music content listened to by a user through a smartphone, and add it to the database. For example, the user management server may receive data on a web page, etc accessed by a user through a laptop computer, and add it to the database.

The user management server may generate an interest list, based on data accumulated in the database. For example, the user management server may extract a keyword from data included in the database, and generate an interest list based on the frequency of each keyword. The interest list may include the name of the object of interest, the category of the object of interest, etc. For example, when a user frequently searches a specific singer's name or song by using a smartphone, the interest list may include the specific singer's name. For example, when a user frequently watches image content of a specific genre by using the image display device 100, the interest list may include the name and genre of the image content that the user watched.

Meanwhile, the image display device 100 may manage data on functions and operations performed in the image display device 100. For example, the image display device 100 may accumulate data on the name, type, and number of executions of application used by a user in the database of the storage unit 140. For example, the image display device 100 may be communicatively connected through the external device interface unit 130, and accumulate data on the name, type, number of uses, etc. of the external device selected by a user in the database of the storage unit 140. In addition, the image display device 100 may generate an interest list based on a database in which data is accumulated.

The image display device 100 may determine whether at least one keyword is included in a portion corresponding to the text of the subtitle data, at operation S532. For example, the image display device 100 may extract a noun from a portion corresponding to text, and decide a proper noun among the extracted nouns as a keyword. The image display device 100 may determine whether a keyword (hereinafter referred to as a text keyword) included in a portion corresponding to the text is a keyword corresponding to user's object of interest, at operation S533.

The image display device 100 may search a text keyword in the interest list. At this time, if the text keyword is included in the interest list, it may be determined that the text keyword corresponds to the user's object of interest.

The image display device 100 may check the category of the text keyword and search the text keyword and the checked category in the interest list. At this time, if at least one of the text keyword and the checked category is included in the interest list, it may be determined that the text keyword corresponds to the user's object of interest.

Meanwhile, if there are a plurality of text keywords corresponding to the user's object of interest, the priority of the object of interest included in the interest list may be checked. At this time, the image display device 100 may determine a certain number (e.g., one) of text keywords in order of high priority among the plurality of text keywords as a text keyword to be transmitted to an advertisement agency server.

At operation S534, the image display device 100 may obtain data corresponding to the text keyword and data corresponding to advertisement information, when the subtitle data includes a text keyword and the text keyword corresponds to the user's object of interest. For example, the image display device 100 may check an advertisement agency server based on advertisement information, and request transmission of data corresponding to text keyword and/or advertisement information to the checked advertisement agency server. At this time, the image display device 100 may transmit text keyword and advertisement information together to the checked advertisement agency server, or may transmit text keywords and advertisement information separately. Hereinafter, data received from the advertisement agency server may be referred to as advertisement data.

Meanwhile, at operation S535, the image display device 100 may obtain advertisement data corresponding to advertisement information, when the subtitle data does not include a text keyword, or when the text keyword does not correspond to the user's object of interest. For example, the image display device 100 may check an advertisement agency server based on advertisement information, and request transmission of advertisement data corresponding to the advertisement information from the checked advertisement agency server.

Meanwhile, the part corresponding to text may further include the location of an area where text is displayed, the size of text, the color of text, and the background color of the area where text is displayed. In addition, the part corresponding to the advertisement information may further include the location of an area where advertisement is displayed. At this time, when requesting transmission of advertisement data to the advertisement agency server, the image display device 100 may transmit the location of the area where text is displayed, the size of text, the location of the area where advertisement is displayed, etc. to the advertisement agency server. In addition, the advertisement agency server may decide the properties (e.g. size) of the advertisement (e.g. image) provided to the image display device 100, in consideration of the location of the area where text is displayed, the size of text, the location of the area where advertisement, etc is displayed.

Referring again to FIG. 5A, at operation S540, the image display device 100 may output an image corresponding to certain content, an object (hereinafter referred to as a subtitle object) corresponding to a subtitle, and/or an object (hereinafter referred to as an advertisement object) corresponding to advertisement data, through the display 180.

The image display device 100 may determine at least one image frame corresponding to the playback time point at which the subtitle is output. The image display device 100 may generate a subtitle object, based on a portion corresponding to text of subtitle data. The image display device 100 may generate an advertisement object, based on advertisement data.

The image display device 100 may output, through the display 180, a screen including an image frame corresponding to a playback time point and at least one of a subtitle object and an advertisement object. For example, when the text corresponding to the subtitle is not included in the subtitle data, the image display device 100 may output a screen including an advertisement object and an image frame corresponding to the playback time point, through the display 180.

The image display device 100 may store an image frame corresponding to the playback time point and at least one of a subtitle object and an advertisement object, in a buffer of the memory 140, before the playback time point at which the subtitle is output. Here, the buffer may refer to a portion of the memory 140 that temporarily stores data. In addition, the image display device 100 may output, through the display 180, a screen including an image frame stored in a buffer, and at least one of a subtitle object and an advertisement object, at a playback time point at which the subtitle is output.

Meanwhile, the image display device 100 may initialize the buffer by deleting data stored in the buffer. For example, the image display device 100 may initialize the buffer when viewing of certain content is terminated. For example, the image display device 100 may delete the advertisement object and subtitle object corresponding to a specific playback time point, when a certain period of time elapses after the image frame at the specific playback time point is output.

Meanwhile, in a state where an advertisement object corresponding to specific advertisement information is stored in the buffer, when the specific advertisement information is included in the subtitle data received through the network interface unit 135, the image display device 100 may maintain the advertisement object stored in the buffer. That is, the image display device 100 may use the advertisement object stored in the buffer, without requesting the advertisement agency server to transmit advertisement data corresponding to the specific advertisement information.

Figures 6A, 6B:
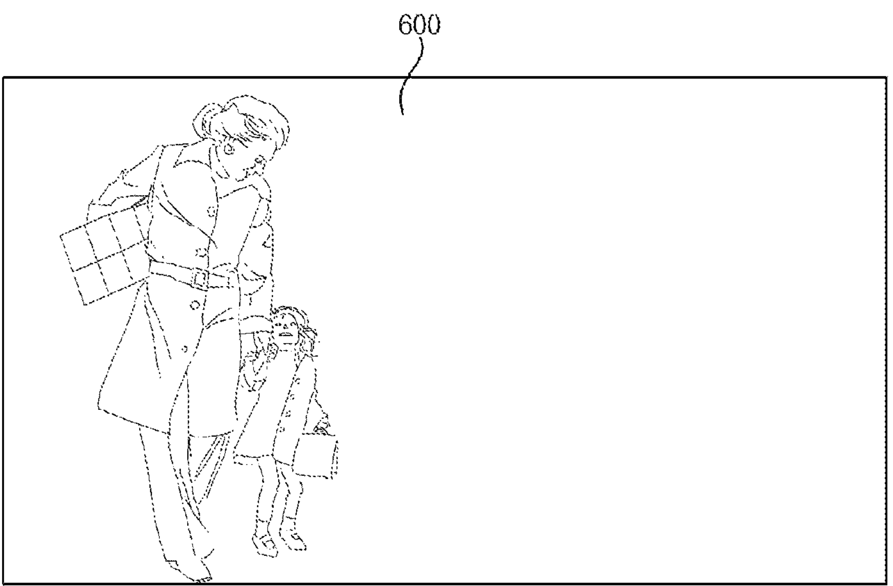
FIGS. 6A to 8 are diagrams for explaining the operation of an image display device.

Referring to FIG. 6A, the image display device 100 may determine an image frame 600 of certain content corresponding to a playback time point at which a specific subtitle is output.

Referring to FIG. 6B, the image display device 100 may parse the subtitle data, and divide into a portion 601 corresponding to the playback time point, a portion 602 corresponding to the text, a portion 603 corresponding to the advertisement information, and a portion 604 corresponding to a display type in which subtitle and/or advertisement is displayed. At this time, the text corresponding to the subtitle may not be included in the portion 602 corresponding to the text.

The image display device 100 may receive advertisement data corresponding to the advertisement information from the advertisement agency server, by using the advertisement information extracted from a portion 603 corresponding to the advertisement information. For example, the image display device 100 may access the advertisement agency server by using a URL which is advertisement information, and receive an image corresponding to the URL from the advertisement agency server. The image display device 100 may generate an advertisement object, based on advertisement data corresponding to advertisement information received from the advertisement agency server.

Figure 6C:
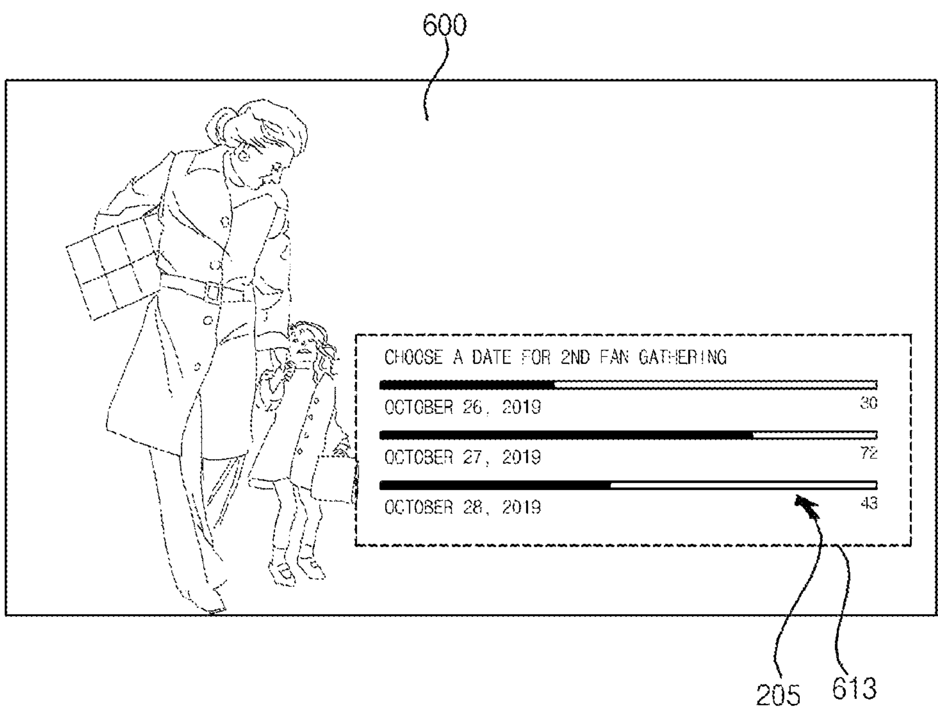

Referring to FIG. 6C, at a playback time point when a specific subtitle is output, the image display device 100 may output a screen including an image frame 600 corresponding to the playback time point and an advertisement object 613 corresponding to an image received from an advertisement agency server, through the display 180.

Meanwhile, advertisement data received from an advertisement agency server may include information related to advertiser who expects effects through advertising. For example, information related to advertiser may include access information indicating the advertiser's server, such as URL. At this time, the image display device 100 may map access information related to advertiser to the advertisement object 613 corresponding to the advertisement data received from the advertisement agency server.

When selecting the advertisement object 613 by using the pointer 205 corresponding to the remote control device 200, the image display device 100 may perform an operation corresponding to the selected advertisement object 613. For example, the image display device 100 may receive a user input of pressing a specific button provided in the remote control device 200, in a state where the pointer 205 displayed in a location corresponding to a specific date (e.g., October 28) of the advertisement object 613. At this time, when the advertiser's access information is mapped to the selected advertisement object 613, the image display device 100 may transmit data for the specific date selected based on the mapped advertiser's access information to the advertiser's server.

Meanwhile, when the advertisement object 613 is selected by using the pointer 205 corresponding to the remote control device 200, the image display device 100 may transmit data corresponding to the selected advertisement object 613 to the user management server. For example, the image display device 100 may transmit advertisement information included in subtitle data to the user management server as data corresponding to the selected advertisement object 613.

Figure 7A:
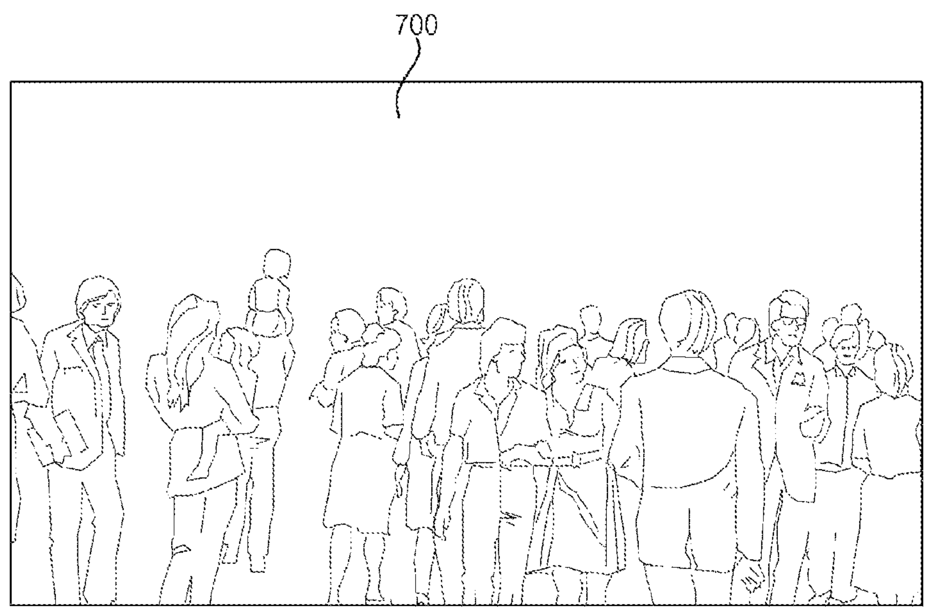

Referring to FIG. 7A, the image display device 100 may determine an image frame 700 of certain content corresponding to a playback time point at which a specific subtitle is output.

Referring to FIG. 7B, the image display device 100 may parse the subtitle data, and divide into a portion 701 corresponding to the playback time point, a portion 702 corresponding to the text, a portion 703 corresponding to advertisement information, and a portion 704 corresponding to a display type in which subtitle and/or advertisement is displayed.

The image display device 100 may extract text corresponding to the subtitle from the portion 702 corresponding to the text. The image display device 100 may generate a subtitle object by using text extracted from the portion 702 corresponding to the text.

Meanwhile, the image display device 100 may determine 'n.flying', 'ustour2019', 'kpop', 'fnc', etc. as a text keyword, in the text corresponding to the subtitles. At this time, when the interest list received from the user management server does not include the object of interest corresponding to the text keyword, the creation of the advertisement object corresponding to the text keyword may be omitted.

The image display device 100 may receive advertisement data corresponding to advertisement information from the advertisement agency server, by using the advertisement information extracted from the portion 603 corresponding to the advertisement information. The image display device 100 may generate a first advertisement object based on the advertisement data corresponding to the advertisement information.

Figure 7C:
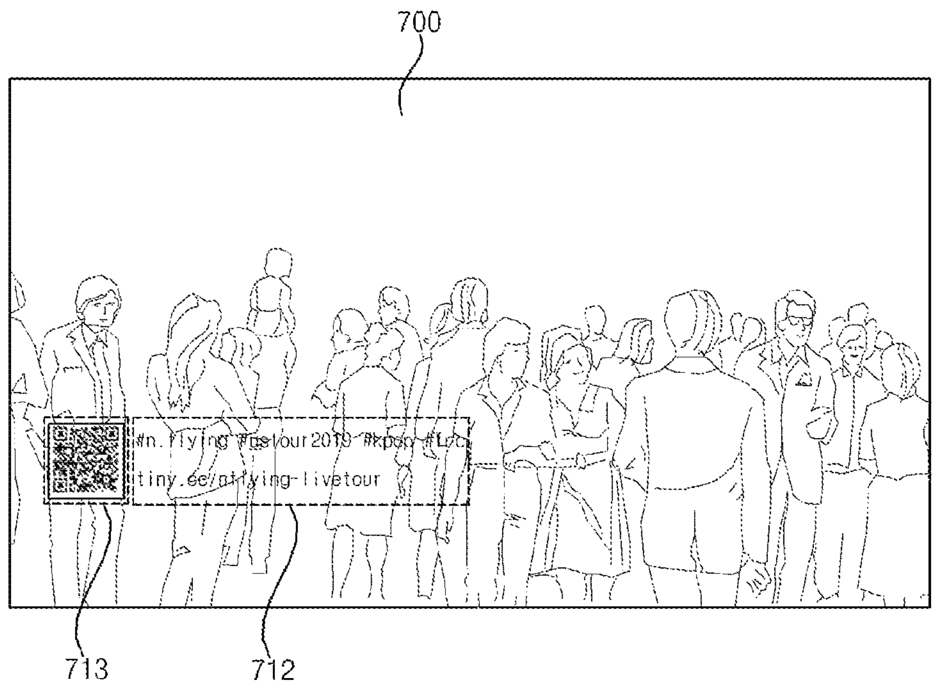

Referring to FIG. 7C, at the playback time point when a specific subtitle is output, the image display device 100 may output a screen including an image frame 700 corresponding to the playback time point, a subtitle object 712, and a first advertisement object 713 corresponding to the advertisement information, through the display 180.

Figure 8A:
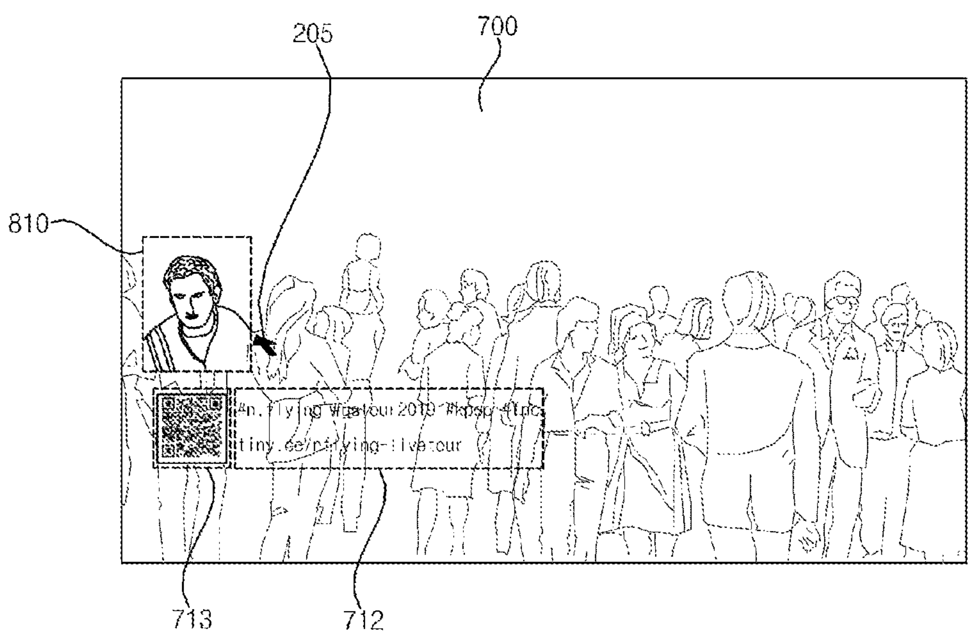

Meanwhile, referring to FIG. 8A, when 'n.flying' is included as an object of interest in the interest list received from the user management server, the image display device 100 may determine 'n.flying' as a text keyword corresponding to the user's object of interest.

At this time, the image display device 100 may also transmit 'n.flying', which is a text keyword corresponding to the user's object of interest, to the advertisement agency server, and receive advertisement data corresponding to 'n.flying' from the advertisement agency server. The image display device 100 may generate a second advertisement object 810 based on advertisement data corresponding to the text keyword 'n.flying'. Meanwhile, when information related to a web page corresponding to 'n.flying' received from the advertisement agency server is included, access information related to the web page may be mapped to the second advertisement object 810.

Meanwhile, the image display device 100 may transmit the location of an area where the text included in the portion 702 corresponding to the text is displayed, the location of an area where the advertisement included in the portion 703 corresponding to the size of the text, the advertisement information is displayed, etc., to the advertisement agency server. In addition, the advertisement agency server may determine the size and display location of the advertisement corresponding to 'n.flying', in consideration of the location of the area where the text is displayed, the size of the text, the location of the area where the advertisement is displayed, etc., and transmit an advertisement corresponding to 'n.flying' according to the determined size, location, etc. to the image display device 100. In addition, the image display device 100 may generate and output the second advertisement object 810, based on the location where the subtitle object 712 and the first advertisement object 713 are displayed.

When selecting the second advertisement object 810 by using the pointer 205 corresponding to the remote control device 200, the image display device 100 may perform an operation corresponding to the selected advertisement object 810. For example, in a state where the pointer 205 is displayed in a position corresponding to the advertisement object 810, the image display device 100 may receive a user input of pressing a specific button provided in the remote control device 200.

At this time, when access information for a web page is mapped to the selected advertisement object 810, the image display device 100 may output a screen for a corresponding web page through the display 180.

Figure 8B:
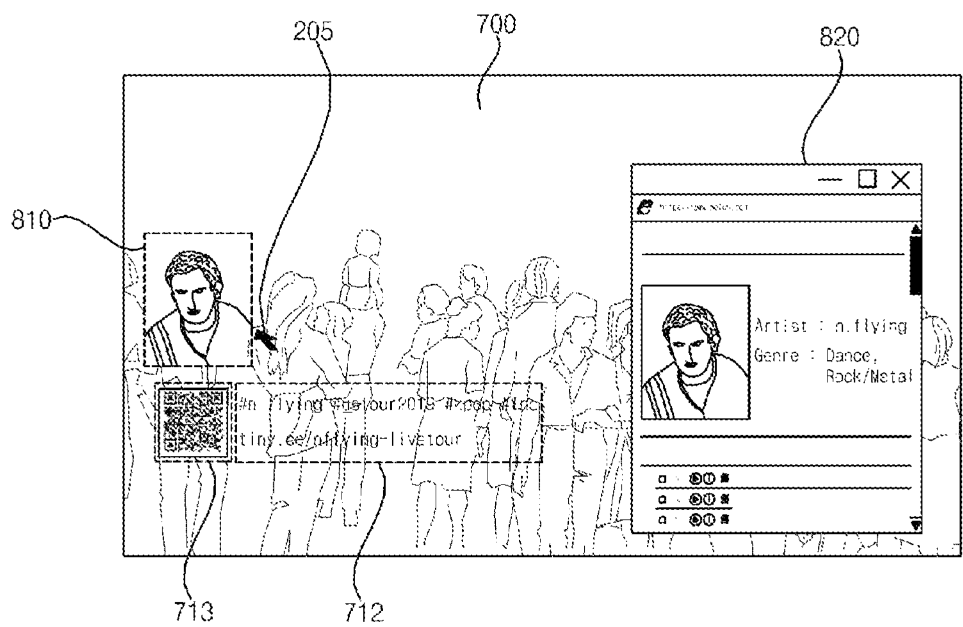

Referring to FIG. 8B, in a state in which a screen for certain content is output through the display 180, the image display device 100 may output a web page corresponding to the selected advertisement object 810 as a pop-up screen 820.

Figure 9:
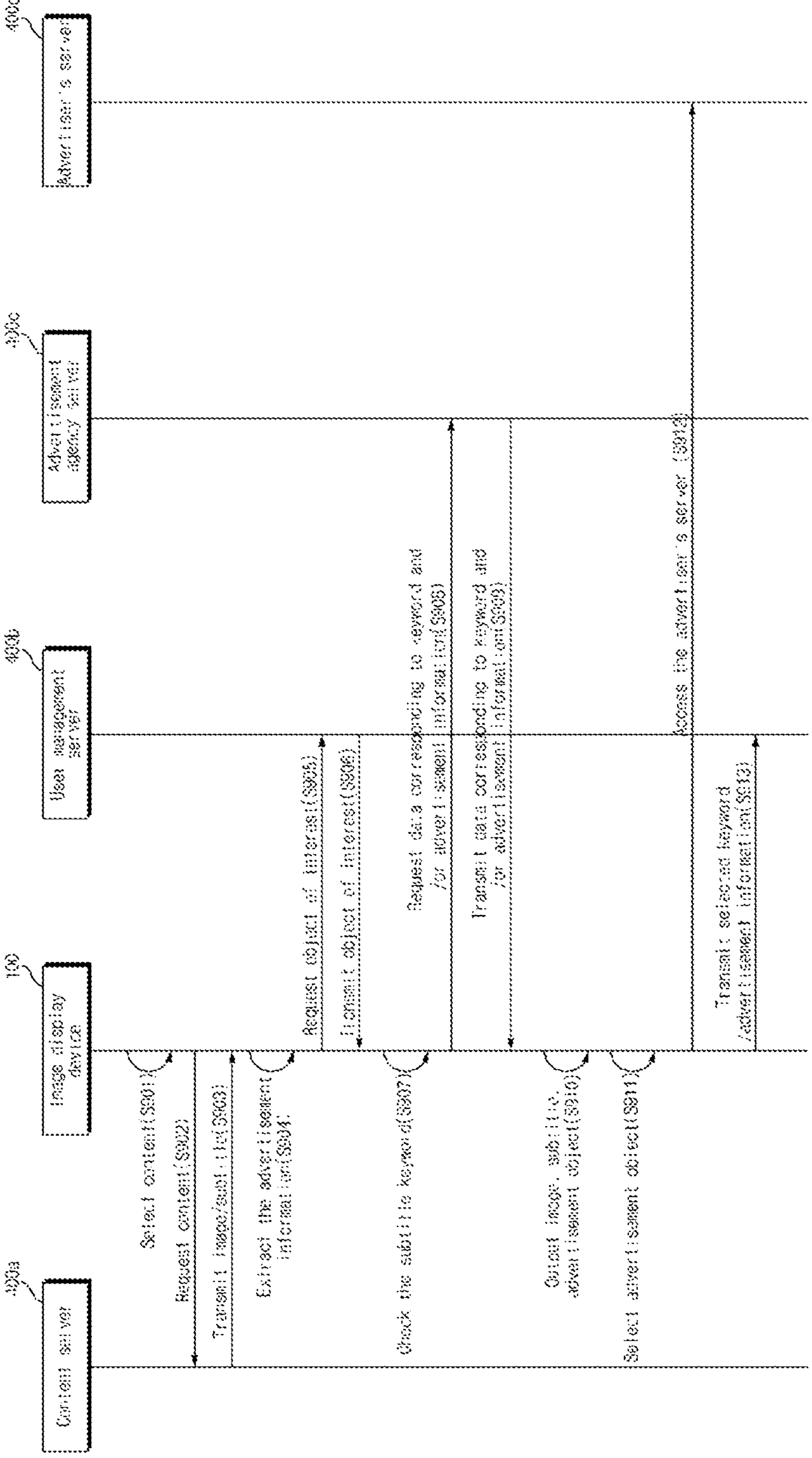
FIG. 9 is a flowchart of a method of operating a system according to an embodiment of the present disclosure.

FIG. 9 is a flowchart of a method of operating a system according to an embodiment of the present disclosure. Detailed descriptions of content that overlaps with the content described in FIGS. 5A to 8 will be omitted.

Referring to FIG. 9, the image display device 100 may select certain content that a user wants to watch, at operation S901.

The image display device 100 may request transmission of certain content from a content server providing the content, at operation S902.

The content server 400*a* may transmit image data and subtitle data corresponding to certain content to the image display device 100, at operation S903.

The image display device 100 may parse the subtitle data and extract the advertisement portion included in the subtitle data, at operation S904.

The image display device 100 may request the user management server 400*b* to transmit an interest list for the user's object of interest, at operation S905.

The user management server 400*b* may transmit an interest list for the user's object of interest of the image display device 100, at operation S906.

The image display device 100 may check whether the text corresponding to the subtitle of the subtitle data includes a text keyword, at operation S907. In addition, the image display device 100 may determine whether a text keyword corresponds to the user's object of interest.

The image display device 100 may request transmission of advertisement data corresponding to a text keyword and/or advertisement data corresponding to advertisement information, at operation S908.

The advertisement agency server 400*c* may transmit the advertisement data corresponding to a text keyword and/or the advertisement data corresponding to advertisement information to the image display device 100, at operation S909.

The image display device 100 may output an image, a subtitle object, and/or an advertisement object corresponding to certain content, at operation S910.

The image display device 100 may receive a user input for selecting an advertisement object by using the pointer 205 corresponding to the remote control device 200, at operation S911.

When the advertiser's access information is mapped to the selected advertisement object, the image display device 100 may access the advertiser's server 400*d* based on the mapped advertiser's access information, at operation S912.

The image display device 100 may transmit data corresponding to the selected advertisement object to the user management server 400*a*, at operation S913. For example, the image display device 100 may transmit text keywords and/or advertisement information corresponding to the selected advertisement object to the user management server 400*a*.

As described above, according to at least one embodiment of the present disclosure, advertisements along with image content can be conveniently provided to a user, by using advertisement information included in subtitle data corresponding to image content.

In addition, according to at least one embodiment of the present disclosure, the advertiser's server 400*d* can be accessed according to the user input, so that interaction between a user who watches the advertisement according to the user input and the advertiser who expects an effect through the advertisement can be induced.

In addition, according to at least one embodiment of the present disclosure, an advertisement corresponding to user's object of interest can be provided by using keywords included in a subtitle.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, a method of operating an image display device of the present disclosure can also be embodied as processor readable code on a processor-readable recording medium. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An image display device comprising:

a display;

a transceiver configured to perform communication through a network; and at least one processor, wherein the at least one processor is configured to:

receive image data and subtitle data corresponding to certain content from a first server through the transceiver, extract, from the subtitle data, first information indicating a second server providing specific advertisement data, second information indicating the specific advertisement data, third information indicating a first area on a screen displayed through the display in which text corresponding to a subtitle is displayed, and fourth information indicating a second area on the screen in which an advertisement is displayed, based on the first information and the second information, request the second server to transmit the specific advertisement data while transmitting data corresponding to the third information and the fourth information to the second server, obtain the specific advertisement data including an advertisement having properties corresponding to the third information and the fourth information from the second server through the transceiver, and output the screen including at least one of an image frame corresponding to the image data, a subtitle object corresponding to the subtitle data or an advertisement object corresponding to the advertisement included in the specific advertisement data, through the display.

2. The image display device of claim 1, wherein the subtitle data includes a playback time point at which the subtitle is displayed, and the text corresponding to the subtitle, wherein the at least one processor is further configured to:

generate the subtitle object, based on the text included in the subtitle data, generate the advertisement object, based on the specific advertisement data, and output the screen at the playback time point.

3. The image display device of claim 1, further comprising a user input receiver configured to receive a user input for selecting an advertisement object of a plurality of advertisement objects, wherein the at least one processor is further configured to:

determine whether access information indicating a third server corresponding to an advertiser is mapped to the selected advertisement object, and access the third server indicated by the access information through the transceiver, based on determining that the access information is mapped to the selected advertisement object.

4. The image display device of claim 3, based on the user input for selecting the advertisement object being received, the at least one processor is further configured to transmit, through the transceiver, the first information and the second information corresponding to the selected advertisement object to a fourth server which manages data on a user of the image display device.

5. The image display device of claim 2, wherein based on the text including at least one keyword, the at least one processor is further configured to:

transmit the at least one keyword to the second server through the transceiver, and receive advertisement data corresponding to the at least one keyword from the second server through the transceiver.

6. The image display device of claim 5, wherein the at least one processor is further configured to:

receive a list of objects of interest for a user of the image display device from a third server that manages data on the user, determine whether a keyword included in the text corresponds to the objects of interest for the user, based on the received list, and transit the keyword to the second server through the transceiver, based on determining that the keyword included in the text corresponds to the objects of interest for the user.

7. The image display device of claim 6, wherein the at least one processor is further configured to:

check a category of the keyword, and search an object of interest corresponding to at least one of the keyword or the checked category, from at least one object of the objects of interest included in the received list.

8. The image display device of claim 2, further comprising a memory comprising a buffer for temporarily storing data, wherein, before the playback time point, the at least one processor is further configured to:

store at least one of the image frame, the subtitle object or the advertisement object in the buffer, and initialize the buffer, based on watching of the certain content being terminated.

9. The image display device of claim 8, wherein in a state where the advertisement object corresponding to the specific advertisement data is stored in the buffer, the at least one processor is further configured to maintain the advertisement object stored in the buffer, based on the received subtitle data including the first information and the second information.

10. A method of operating an image display device, the method comprising:

receiving image data and subtitle data corresponding to certain content from a first server;

extracting, from the subtitle data, first information indicating a second server providing specific advertisement data, second information indicating the specific advertisement data, third information indicating a first area on a screen in which text corresponding to a subtitle is displayed, and fourth information indicating a second area on the screen in which an advertisement is displayed;

based on the first information and the second information, requesting the second server to transmit the specific advertisement data while transmitting data corresponding to the third information and the fourth information to the second server;

obtaining the specific advertisement data including an advertisement having properties corresponding to the third information and the fourth information from the second server; and outputting the screen including at least one of an image frame corresponding to the image data, a subtitle object corresponding to the subtitle data or an advertisement object corresponding to the advertisement included in the specific advertisement data.

* * * * *